United States Patent
Ueno

(10) Patent No.: US 7,192,044 B2
(45) Date of Patent: Mar. 20, 2007

(54) BICYCLE HEADSET

(75) Inventor: Koken Ueno, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/140,922

(22) Filed: Jun. 1, 2005

(65) Prior Publication Data

US 2006/0055146 A1  Mar. 16, 2006

(30) Foreign Application Priority Data

Sep. 13, 2004  (JP)  ............... 2004-264862

(51) Int. Cl.
*B62K 19/32* (2006.01)

(52) U.S. Cl. .................................... 280/280

(58) Field of Classification Search ............... 280/279, 280/280
See application file for complete search history.

(56) References Cited

U.S. PATENT DOCUMENTS

| | | | |
|---|---|---|---|
| 4,223,563 A * | 9/1980 | Kine ................... | 74/501.6 |
| 4,770,435 A | 9/1988 | Cristie | |
| 4,946,181 A * | 8/1990 | Romano ............... | 280/279 |
| 5,095,770 A | 3/1992 | Rader, III | |
| 5,297,811 A * | 3/1994 | Chi ..................... | 280/280 |
| 5,330,220 A | 7/1994 | Nagano | |
| 5,967,538 A * | 10/1999 | Callaluca et al. ....... | 280/279 |
| 6,122,991 A | 9/2000 | Clarkson | |
| 6,167,780 B1 | 1/2001 | Chen | |
| 6,220,398 B1 | 4/2001 | Wu | |
| 6,343,806 B1 | 2/2002 | Lee | |
| 6,523,847 B1 * | 2/2003 | Chien .................. | 280/279 |
| 2003/0230228 A1 | 12/2003 | Kinoshita | |
| 2004/0188976 A1 | 9/2004 | Schmider | |
| 2005/0057017 A1 | 3/2005 | Hara et al. | |

FOREIGN PATENT DOCUMENTS

| EP | 520383 A1 * | 12/1992 |
|---|---|---|
| EP | 1270370 A2 * | 1/2003 |

* cited by examiner

*Primary Examiner*—Kevin Hurley
(74) *Attorney, Agent, or Firm*—Global IP Counselors, LLP

(57) ABSTRACT

A bicycle headset has an adjustment member and a fastening member. A bicycle fork column passes through the adjustment member and the fastening member. The fastening member is fastened securely to the bicycle fork column by applying pressure to the outer peripheral side of the bicycle fork column. The fastening member non-rotatably mates with the adjustment member in such a way so as to move freely in the axial direction of the bicycle fork column.

20 Claims, 9 Drawing Sheets

BICYCLE HEADSET

CROSS-REFERENCE TO RELATED APPLICATIONS

This application claims priority to Japanese Patent Application No. 2004-264862. The entire disclosure of Japanese Patent Application No. 2004-264862 is hereby incorporated herein by reference.

BACKGROUND OF THE INVENTION

1. Field of the Invention

This invention generally relates to a headset for a bicycle. More specifically, the present invention relates to a headset for attaching a fork column of bicycle front fork to a head tube of a bicycle.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle headset.

A front fork for a bicycle is attached to a head tube so as to be able to rotate freely. At both ends of the head tube are ball bearings. Male threads are provided on an upper end of the fork column of the front fork. A handle stem is attached to the male threads. A headset is attached to the fork column to secure the front fork to the head tube. Conventional headsets have lock nuts that lock upper ball bearing retainers. The upper ball bearing retainers mate to male threads on the outer periphery of the fork column. (See, for example, U.S. Pat. No. 5,330,220.)

However, recently front forks that do not have male threads on the fork column have been widely used. With this type of front fork, the fork column protrudes upward from the head tube and the handle stem is attached on the protruding fork column. In this type of conventional headset, there is a lock nut and an adjustment bolt, which mates with the lock nut. A cover member is attached by the adjustment bolt to the top part of the handle stem. A compression ring with a slit is disposed between the fork column and an upper ball bearing retainer. (See, for example, U.S. Pat. No. 5,095,770.)

In a conventional headset having this type of structure, after the compression ring and the handle stem are placed onto the fork column, the cover member is put onto the top part of the handle stem. The adjustment bolt is then mated to the lock nut to attach the front fork to the head tube. The ball bearing contact is adjusted by tightening or untightening the adjustment bolt after inserting and tightening the compression ring between the fork column and the ball bearing retainer. The height of the handle stem is adjusted by adding ring-shaped spacers between the handle stem and the upper ball bearing retainer and between the handle stem and the cover member.

In the conventional headset described above, the ball bearing contact is adjusted by the handle stem. The handle stem applies pressure to the upper ball bearing retainer through the cover member. Thus, it is necessary to have a separate member, such as a ring-shaped spacer for adjusting the height of the handle stem. Because of this, the adjustment of the height of the handle stem is difficult. Moreover, because the pressure is applied to the ball bearing retainer through the handle stem, the pressure is removed from the ball bearing retainer when the handle stem is removed. Because of this, it is necessary to adjust the ball bearing contact each time the handle stem is removed.

In view of the above, it will be apparent to those skilled in the art from this disclosure that there exists a need for an improved bicycle headset that allows adjustment of the ball bearing contact independent of the handle stem. This invention addresses this need in the art as well as other needs, which will become apparent to those skilled in the art from this disclosure.

SUMMARY OF THE INVENTION

An object of the present invention is to facilitate adjustment of the vertical height of the handle stem. Another object of the present invention is to adjust the ball bearing contact independent of the handle stem.

A bicycle headset according to a first aspect of the present invention is a headset that includes a tubular adjustment member, a fastening member and a first nut member. The tubular adjustment member has a top end portion, a bottom end portion, a through-bore, a male threads section and a retainer part. The through-bore is configured and arranged for a bicycle fork column. The male threaded section is on an outer peripheral surface of the top end portion. The retainer part is disposed on the bottom end portion. The retainer part is configured and arranged to retain at least one ball bearing. The fastening member is adjacent to the top end portion of the adjustment member. The fastening member is configured and arranged to be releasably attached to the bicycle fork column by applying pressure to an outer peripheral side of the bicycle fork column. The fastening member has a mating part that mates to the adjustment member such that the fastening member is able to move freely in an axial direction. The first nut member has a first female threaded hole that mates with the male threaded section such that the first nut member is able to contact the fastening member.

When the headset is assembled, the first nut member is threaded onto the male threaded section of the adjustment member. Moreover, a state is created in which the mating part of the fastening member is mated with the adjustment part. The bearing is disposed at a bottom edge of the head tube and is in contact with a shoulder part of the front fork. The fastening member is mated to the adjustment member. The first nut member is disposed on an outer peripheral surface of the adjustment member at an end of the fork column that protrudes through the head tube. This assembly is in contact with the bearing that is disposed at the top end of the head tube. The fastening member is then rigidly attached on the outer peripheral surface of the fork column. Moreover, the first nut member is rotated, through the use of a tool such as a crescent wrench, until it contacts the fastening member. The fastening member also mates with the adjustment member so that the adjustment member cannot rotate relative to the fork column. Thus, it is possible for the adjustment member to move downward relative to the fastening member to adjust the bearing contact. Accordingly, the fork column rotates freely in the head tube when the bearing contact is adjusted. The adjustment member and the fastening member are disposed on the outer periphery of the fork column. Thus, the bearing contact is adjusted independent of the handle stem. Moreover, because the handle stem is not used for fastening the front fork, the vertical height of the handle stem can be adjusted easily.

The bicycle headset according to a second aspect of the present invention is the bicycle headset according to the first aspect of the present invention wherein the bicycle headset has a second nut member. The second nut member contacts the first nut member and has a second female threaded hole that mates with the male threaded section. In this case, the first nut member is prevented from rotating by the second nut member. This makes it easy to maintain the adjusted contact of the bearing.

The bicycle headset according to a third aspect of the present invention is the bicycle headset according to the first or second aspects, wherein the fastening member has a ring member that includes a first ring part, a protruding part, a slit and a locking member. The first ring part is on the outer peripheral surface of the fork column. The protruding part protrudes in the outer radial direction of the first ring part. The slit runs in the radial direction from the inner peripheral part of the first ring part to the protruding part. The locking member is disposed on the protruding part and adjusts the width of the slit. In this case, a first ring part is disposed along with the adjustment member on the fork column. The locking member is tightened on the protruding part so as to compress the slit width in order to affix the fastening member to the fork column. Here, the fastening member is fastened securely to the fork column by decreasing the width of the slit by tightening the locking member.

The bicycle headset according to a fourth aspect of the present invention is the bicycle headset of any of the first through third aspects, wherein the through-bore in the adjustment member is eccentric relative to the outer peripheral surface of the tube-shaped part. A wire insertion groove for inserting wiring extends in the axial direction of the fork column at the thickest part of the wall of the adjustment member in an inner periphery of the through-bore. The fork column is eccentric relative to a tubular element of the adjustment member, thereby making it possible to fabricate a thick-wall part in the adjustment member. Consequently, it is possible to fabricate a wire insertion groove in the thick-wall without increasing the size of the adjustment member. This makes it possible to route the electrical wiring within the head tube and through the adjustment member.

The bicycle headset according to a fifth aspect of the present invention is the bicycle headset according to the fourth aspect wherein, in the fastening member, the first ring part is concentric with the through-bore of the adjustment member. The fastening member further includes a second ring part that is disposed facing the adjustment member. The second ring part has the mating part that is concentric with the adjustment member. The second ring part is integral with the first ring part. The through-bore of the adjustment member is eccentric relative to the outer peripheral surface of the adjustment member such that the first ring part of the fastening member is eccentric relative to the adjustment member. The second ring part of the fastening member is disposed concentric with the adjustment member. This facilitates mating the adjustment member to the mating part of the fastening member so that there can be free motion in the axial direction with no rotational motion.

The bicycle headset according to a sixth aspect of the present invention is the bicycle headset according to the fifth aspect, wherein the fastening member further includes an interface section and a wire access aperture. The interface section is disposed between the first ring and the second ring. The wire access aperture is continuous with a wire insertion groove and is disposed in the second ring part and the interface section. The wire access aperture allows access of the wiring in the wire insertion groove from the outside. In this case, it is easy to access the electrical wiring that is inserted into the wire insertion groove from the outside.

The bicycle headset according to a seventh aspect of the present invention is the bicycle headset according to any of the first through third aspects wherein, the mating part of the fastening member is a fastening member step that protrudes in the direction of the adjustment member at a surface that faces the adjustment member. The adjustment member has an adjustment member step that non-rotatably mates with the fastening member step in such a way so as to allow axial movement. In this case, it is possible to mate the adjustment member to the fastening member in such a way that it can move freely in the axial direction but cannot rotate. In this way, the adjustment member and the fastening member are coupled with an easily-fabricated shape.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
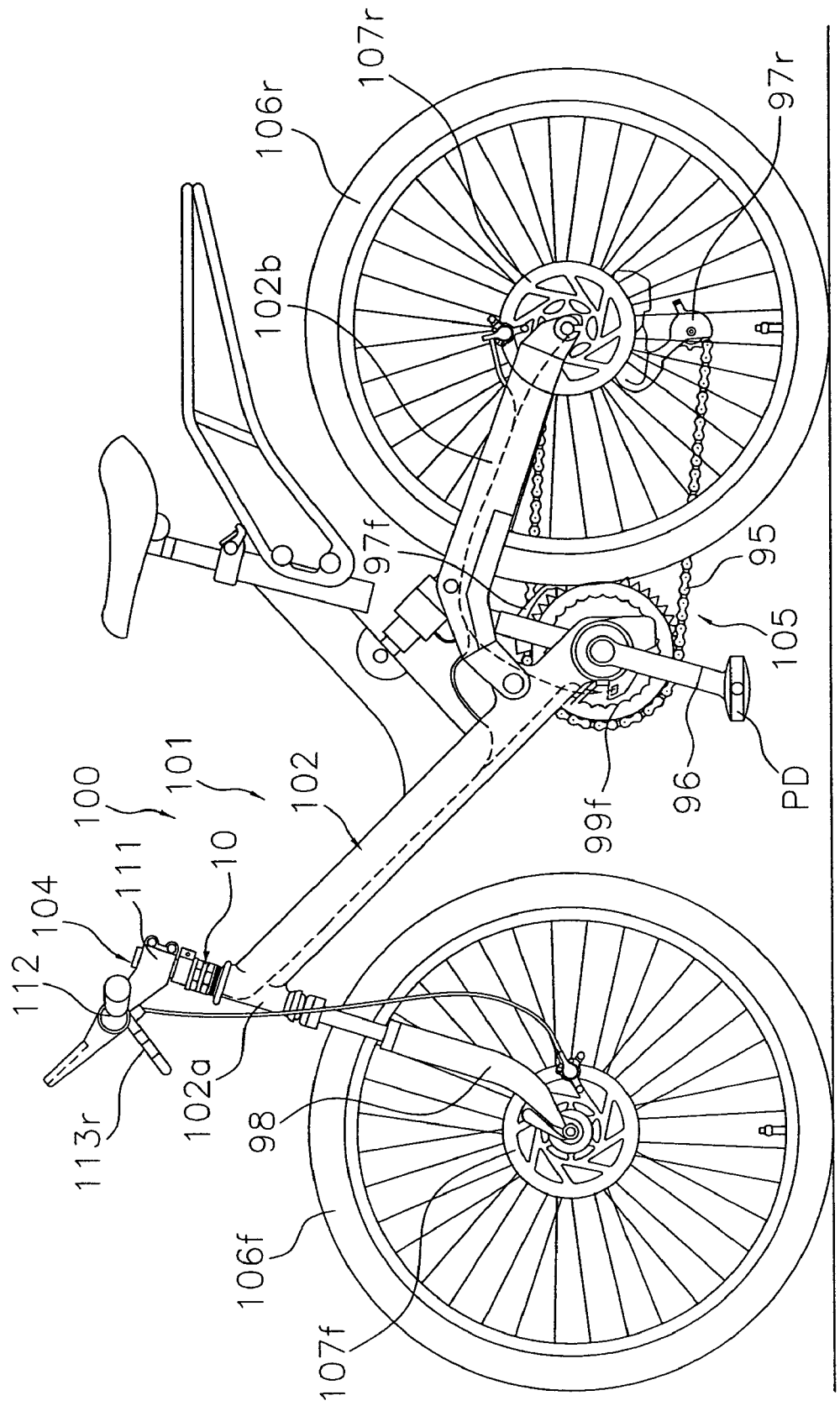
FIG. 1 is a left side elevational view of a bicycle equipped with a bicycle headset in accordance with a first embodiment of the present invention.

Referring initially to FIG. 1, a bicycle 100 includes a bicycle headset 10, a front fork 98, a frame 101, a frame unit 102, a handle member 104, a drive mechanism 105, a front wheel 106f, a rear wheel 106r, a front brake device 107f and a rear brake device 107r. The frame unit 102 includes a head tube 102a and a swing arm 102b. The front fork 98 has a suspension and is installed in the head tube 102a. The head tube 102a is disposed at the front part of the frame unit 102. The swing arm 102b is equipped with a suspension and is installed at the rear of the bicycle 100 in order to swing freely. The absorption characteristics of the suspensions can be varied through electrical control. The drive mechanism 105 includes, for example, a crank 96, a chain 95, pedals PD, front and rear electrically controllable electric derailleurs 97f and 97r, a front sprocket set 99f and a rear sprocket set (not shown).

The handle member 104, as shown in FIG. 1, includes a handle stem 111, and a handlebar 112. The handlebar 112 is rigidly affixed into the handle stem 111 at a top end of the handle stem 111. The handlebar 112 is a bar-type handlebar and is equipped with a left brake lever (not shown) and a right brake lever 113r. Moreover, the handlebar 112 is equipped with an electronic operating part (not shown) for operating electrically the derailleurs 97f and 97r, and the suspensions of the front fork 98 and the swing arm 102b.

Figure 2:
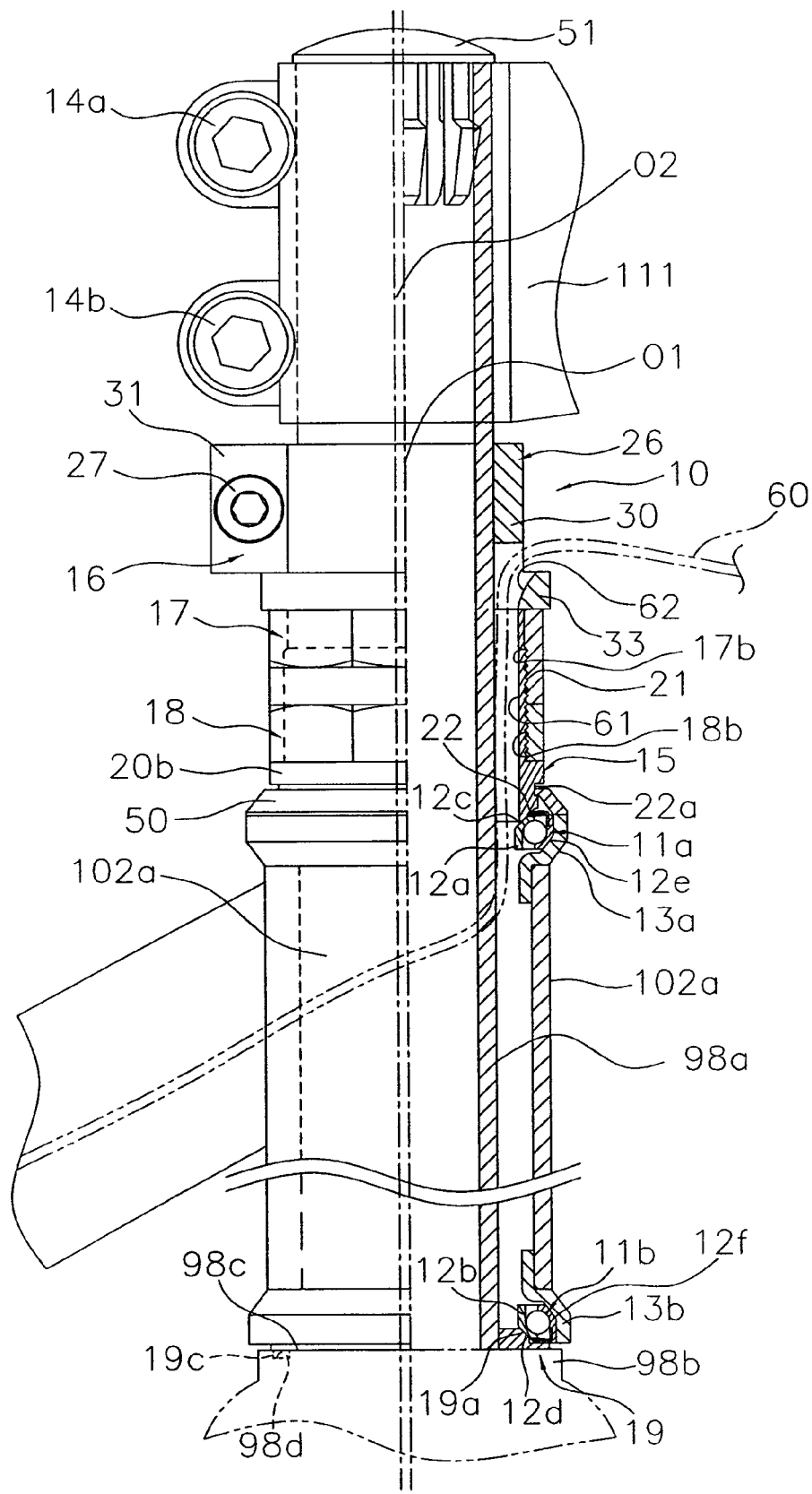
FIG. 2 is a partial cross-sectional view of the bicycle headset coupled to the front fork and head tube of the bicycle illustrated in FIG. 1 in accordance with the first embodiment of the present invention.
Figure 3:
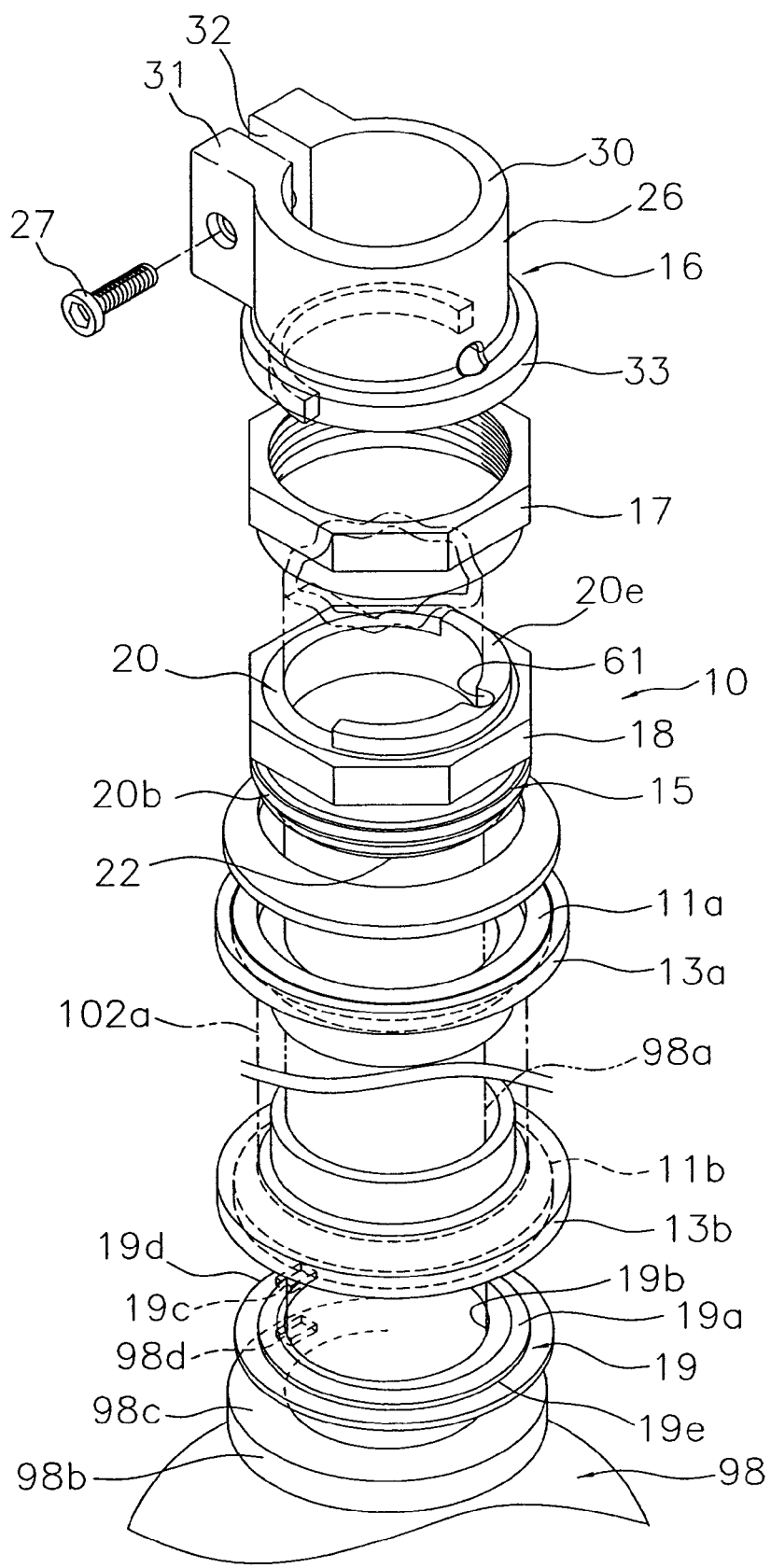
FIG. 3 is an exploded assembly view of the bicycle headset coupled to the front fork of the bicycle illustrated in FIG. 1 in accordance with the first embodiment of the present invention.

The front fork 98 includes a fork column 98a, a fork shoulder 98b, a fork step 98c and an indentation 98d. The fork column 98a, as shown in FIGS. 2 and 3, is rotatably secured in the head tube 102a by the bicycle headset 10 according to the first embodiment of the present invention. The handle stem 111 is rigidly affixed on an outer periphery surface of the fork column 98a at a top end portion of the fork column 98a. The handle stem 111 is rigidly affixed to the fork column 98a by two attachment bolts 14a and 14b. The top edge of the fork column 98a is covered by the cap member 51. The cap member 51 is made of, for example, a synthetic resin. The cap member 51 is elastically secured within the fork column 98a by expanding against an inner peripheral surface of the fork column 98a.

The head tube 102a is oversized. Specifically, the head tube 102a has a diameter that is larger than conventional head tubes. For example, a conventional inner diameter of a head tube would be about 30 mm, but in this embodiment, the inner diameter is about 32 mm.

A pair of top and bottom ball bearing units 11a and 11b, equipped with seals of the corresponding sizes, is disposed at a top and bottom end of the head tube 102a, respectively. The top and bottom ball bearing units 11a and 11b are disposed on first and second bearing cups 13a and 13b, respectively. The head tube 102a, top and bottom ball bearing units 11a and 11b and the first and second bearing cups 13a and 13b are securely fastened by an appropriate fastening means such as a press fit. The top and bottom ball bearing units 11a and 11b include top and bottom inner rings 12a and 12b, respectively. The top and bottom ball bearing units 11a and 11b further include top and bottom outer rings 12e and 12f, respectively. A plurality of ball bearings is disposed in the top and bottom ball bearing units 11a and 11b. The ball bearings are between the top and bottom inner rings 12a and 12b and the top and bottom outer rings 12e and 12f, respectively. The top and bottom inner rings 12a and 12b include top and bottom taper surfaces 12c and 12d, respectively. The top and bottom taper surfaces 12c and 12d are broadened toward their edges when installed on the head tube 102a. The fork column 98a of the front fork 98 is held in the head tube 102a against the fork shoulder 98b by the bicycle headset 10. This construction makes it possible to install the top and bottom ball bearing units 11a and 11b while adjusting the amount of contact with the ball bearings.

Referring to FIG. 2, the bicycle headset 10 includes an adjustment member 15, a fastening member 16, a first nut member 17, a second nut member 18, an attachment ring 19 and a cover member 50. The adjustment member 15 serves as a top retainer for adjusting the contact with the top and bottom ball bearing units 11a and 11b. The fastening member 16 is rigidly fastened to the outer peripheral surface of the fork column 98a. The first and second nut members 17 and 18 mate with the adjustment member 15. The attachment ring 19 is a bottom retainer that contacts the fork shoulder 98b and the bottom ball bearing unit 11b at the bottom part of the head tube 102a. The cover member 50 covers an outer peripheral side of the adjustment member 15 and the top ball bearing unit 11a.

Referring to FIGS. 2–5, the adjustment member 15 is made of metal, for example, and has a tubular element 20, a male threaded section 21 and a retainer part 22. The tubular element 20 is an annular member with the fork column 98a passing therethrough. The male threaded section 21 is fabricated on an outer peripheral surface of a top portion of the tubular element 20 of the adjustment member 15. The male threaded section 21 has M33 sized threads, for example, and mates with the first and second nut members 17 and 18. The retainer part 22 applies pressure to the top ball bearing unit 11a. The retainer part 22 is located at a bottom portion of the tubular element 20 and is configured and arranged to retain at least one ball bearing.

The tubular element 20 is disposed coaxially with the head tube 102a. The tubular element 20 of the adjustment member 15 has a through-bore 20a, a large-diameter shield 20b, a thin-wall 20c, a thick-wall 20d and an adjustment member step 20e. The through-bore 20a forms an inner diameter of the tubular element 20 of about 26 mm, for example. The through-bore 20a allows the fork column 98a to pass therethrough. The fork column 98a has a standard outer diameter of 25.4 mm, for example. The large-diameter shield 20b is fabricated between the male threaded section 21 and the retainer part 22.

Figure 5:
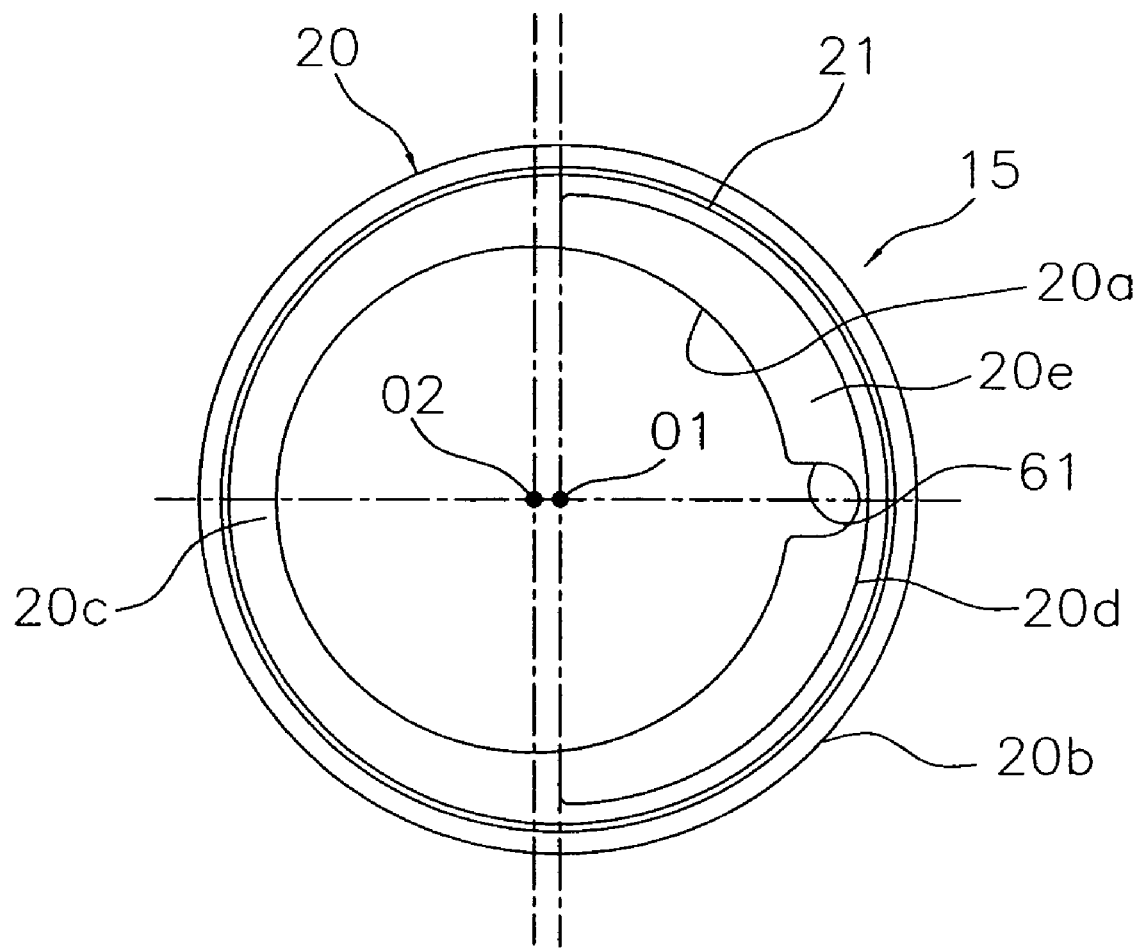
FIG. 5 is a bottom view of an adjustment member of the bicycle headset illustrated in FIGS. 1–4 in accordance with the first embodiment of the present invention.
Figure 6:
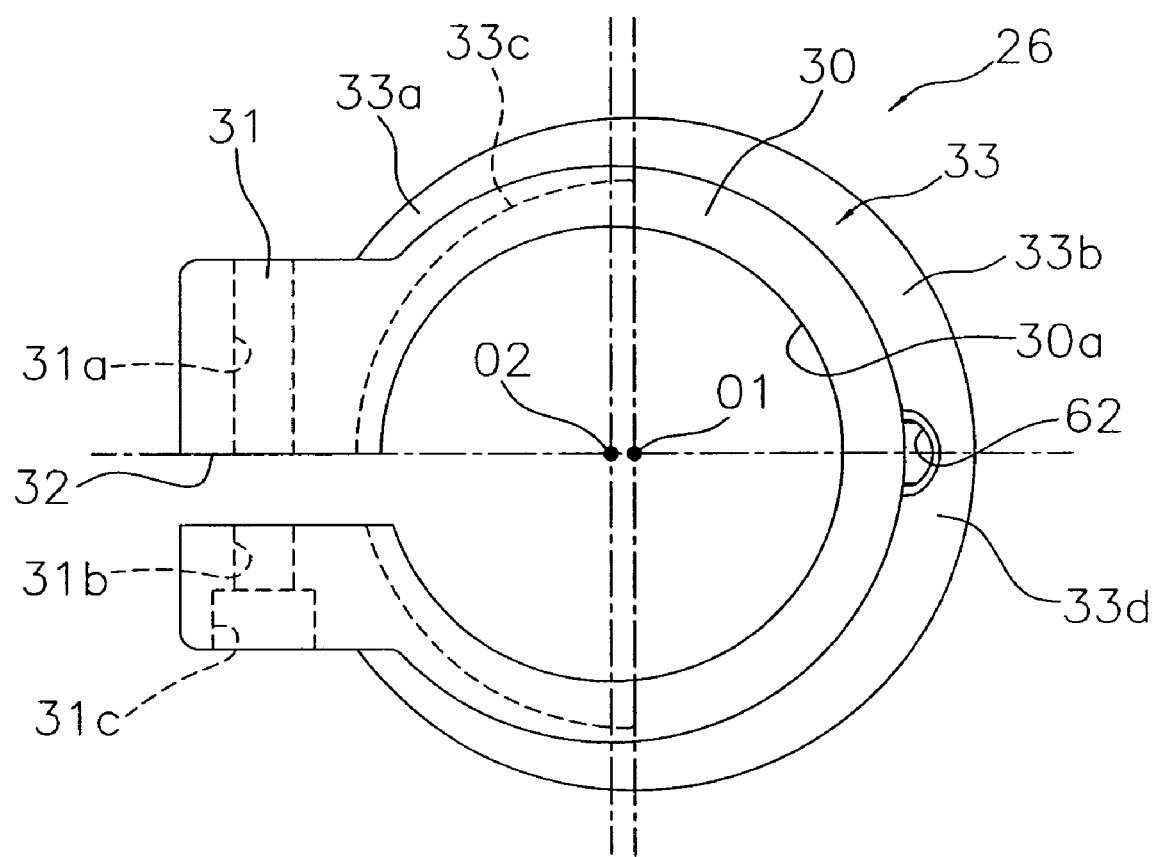
FIG. 6 is a top elevational view of a fastening member of the bicycle headset illustrated in FIGS. 1–4 in accordance with the first embodiment of the present invention.
Figure 7:
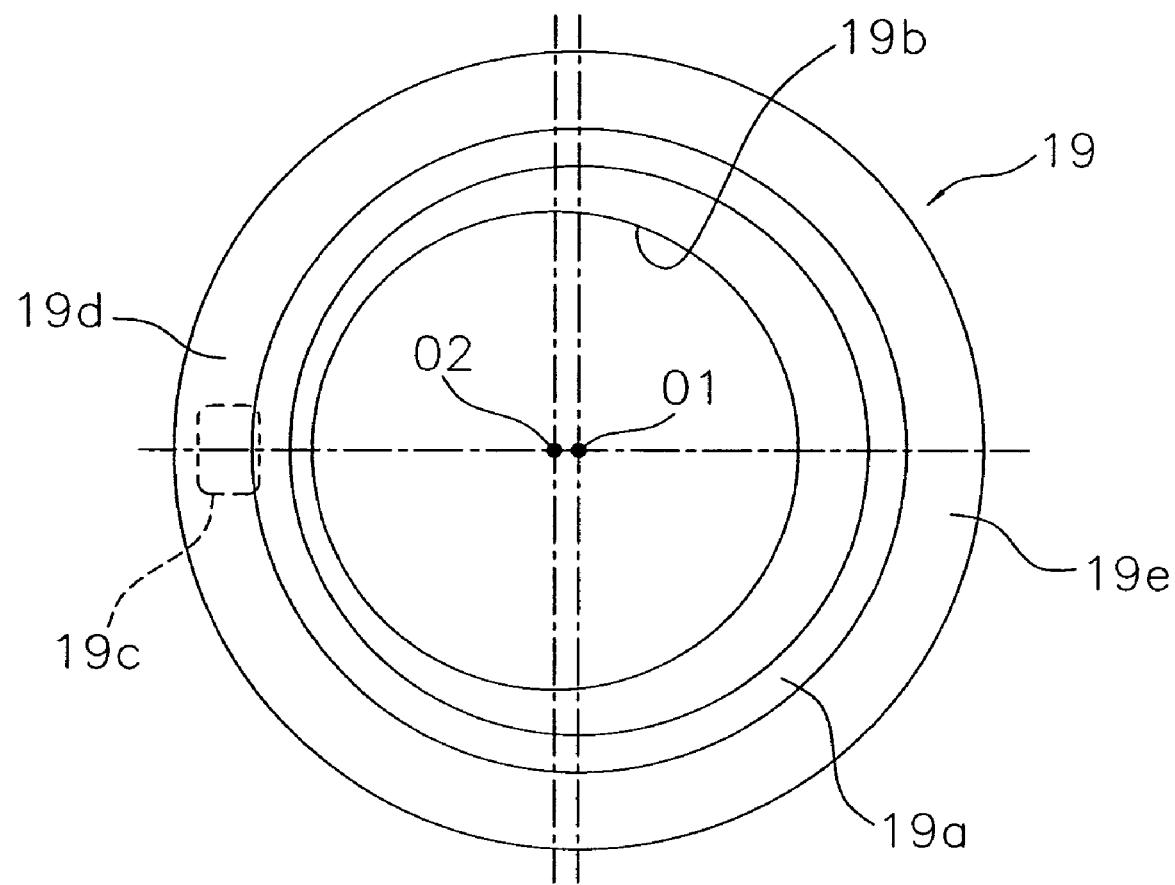
FIG. 7 is a top elevational view of an attachment ring of the bicycle headset illustrated in FIGS. 1–4 in accordance with the first embodiment of the present invention.

Referring to FIGS. 5–7, a first central axis O1 runs longitudinally through the bicycle headset 10 and passes through the center of the circle formed by the outer peripheral surface of the tubular element 20. The first central axis O1 also passes through the center of the head tube 102a. A second central axis O2 runs longitudinally through the through-bore 20a, as shown in FIG. 5, and is eccentric to the first central axis O1 by about 1.3 mm, for example. The second central axis O2 is centered at the center of the through-bore 20a and is the central axis of the fork column 98a. Consequently, as seen in FIG. 5, the through-bore 20a is offset from the outer peripheral surface of the tubular element 20. Accordingly, a wall thickness of the tubular element 20 gradually thickens when moving from the thin-wall 20c to the thick-wall 20d.

Figure 4:
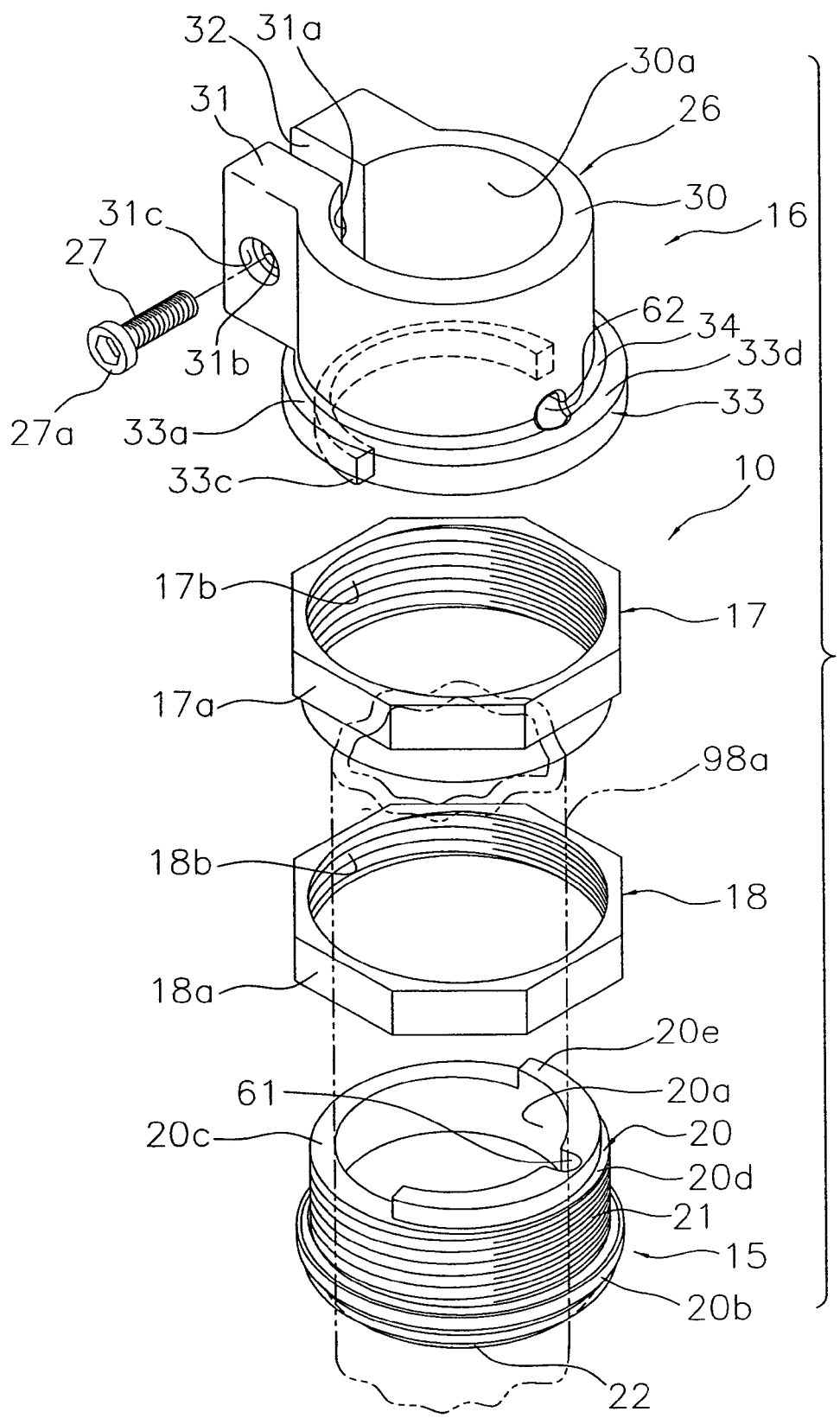
FIG. 4 is an enlarged view of the exploded assembly view of the bicycle headset illustrated in FIG. 3 in accordance with the first embodiment of the present invention.

Referring to FIGS. 4 and 5, the adjustment member step 20e is fabricated on the thick-wall 20d. The adjustment member step 20e has a semicircular, arc shape that has a diameter smaller than that of the male threaded section 21. The adjustment member step 20e protrudes from a top edge surface of the thick wall 20d of the tubular element 20 towards the fastening member 16. The adjustment member step 20e non-rotatably mates with a portion of the fastening member 16. Furthermore, the adjustment member step 20e and the thick-wall 20d have a wire insertion groove 61 that runs in the axial direction. The wire insertion groove 61 is for inserting electrical wiring 60 that connects to the electric operating part.

The retainer part 22, as shown in FIG. 2, is formed with a taper surface that narrows towards the top taper surface 12c. The retainer part 22 contacts the top taper surface 12c and presses the top and bottom ball bearing units 11a and 11b in the axial direction and the radial direction. The retainer part 22 adjusts contact with the ball bearings by changing the pressing force on the top and bottom ball bearing units 11a and 11b. Adjustment of the ball bearing contact is performed in order to install the front fork 98 in the head tube 102a so that it will rotate smoothly without rattling. Furthermore, the retainer part 22 includes a ring-shaped attachment groove 22a. The cover member 50 is attached to the ring-shaped attachment groove 22a. The attachment groove 22a is formed between the large-diameter shield 20b and the retainer part 22. The cover member 50 has a bowed external appearance and is made from a synthetic resin, for example, that can be stretched and compressed.

Referring to FIGS. 2–4 and 6, the fastening member 16 is securely fastened to the outer peripheral surface of the fork column 98a. The fastening member 16 is adjacent a top end portion of the adjustment member 15. The fastening member 16 is secured by applying pressure to the outer peripheral side of the fork column 98a. The fastening member 16 has a ring member 26 and a tightening bolt 27 attached to the ring member 26. The ring member 26 has a first ring part 30, a protruding part 31, a fastening member slit 32 and a second ring part 33. The protruding part 31 protrudes from the first ring part 30. The fastening member slit 32 is fabricated in the protruding part 31. The second ring part 33 is eccentric relative to the first ring part 30.

The first ring part 30 has a fastening-hole 30a that is centered on the second central axis O2. The first ring part 30 has a uniform wall thickness. As shown in FIG. 2, the first ring part 30 is fastened securely to the outer peripheral surface of the fork column 98a.

Referring to FIG. 6, the protruding part 31 protrudes in the outer radial direction from the outer peripheral surface of the first ring part 30. The fastening member slit 32 runs in the radial direction from the inner peripheral part of the first ring part 30 through the protruding part 31. The fastening member slit 32 has a width in the outer peripheral direction of about 3 mm, for example. The protruding part 31 is fabricated with a threaded-bore 31a and a bolt through-bore 31b.

A tightening bolt or locking member 27 is inserted across the fastening member slit 32 and threaded into the threaded-bore 31a. The bolt through-bore 31b is fabricated on the same axis as the threaded-bore 31a. A countersink 31c is formed in the bolt through-bore 31b. The tightening bolt 27 passes through the bolt through-bore 31b and the fastening member slit 32. The tightening bolt 27 threads into the threaded-bore 31a. The tightening bolt 27 is perpendicular to the longitudinal direction of the fastening member slit 32. The tightening bolt 27 has a headset 27a that is hexagon shaped, for example, and rests in the countersink 31c. When the tightening bolt 27 is tightened into the threaded bore 31a, the width of the fastening member slit 32 is decreased, thereby causing the fastening-hole 30a to press firmly against the outer periphery of the fork column 98a. Accordingly, the fastening member 16 and the ring member 26 are releasably affixed to the fork column 98a.

Referring to FIG. 6, the second ring part 33 is centered on the first central axis O1. The second ring part 33 has a thin-wall 33a, a thick-wall 33b, a fastening member step 33c and a maximal wall 33d. The fastening-hole 30a and the fastening member slit 32 are fabricated in the second ring part 33 as well. Consequently, the fastening-hole 30a is eccentric relative to an outer peripheral surface of the second ring part 33. The wall thickness of the second ring part 33 gradually thickens when moving from the thin-wall 33a to the thick-wall 33b. The mating part or fastening member step 33c protrudes from a bottom edge surface of the thin-wall 33a towards the adjustment member 15. The fastening member step 33c is a semicircular, arc shape with the same outer diameter as the adjustment member step 20e of the tubular element 20. The fastening member step 33c mates with the adjustment member step 20e so as to cause the adjustment member 15 to mate with the fastening member 16 in such a way so as to move freely in the axial direction, but to be non-rotatable.

It will be apparent to one of skill in the art from this disclosure that the mating structure is not limited to a step, but rather may be any structure wherein the mating of the adjustment member and the fastening member allows movement in the axial direction and does not allow rotation. For example, a variety of different types of mating structures can be used, such as a mating structure with a pin and a pin groove that guides the pin or a mating structure with a guide hole or a guide groove that guides a protruding part.

An interface section 34 is formed between the first ring part 30 and the second ring part 33, as is illustrated in FIGS. 2–4. Referring to FIGS. 2–4 and 6, a wire access aperture 62 is formed on an inner peripheral surface of the maximal wall 33d of the thick-wall 33b. The wire access aperture 62 is disposed in the interface section 34 and the second ring part 33. When the adjustment member 15 and the fastening member 16 are mated together, the wire access aperture 62 is continuous with the wire insertion groove 61. The wire access aperture 62 is open to the outside at the interface section. Accordingly, the electrical wiring 60 that is inserted into the wire insertion groove 61 can be accessed from the outside.

The first and second nut members 17 and 18 include first and second octagonal tool mating parts 17a and 18a, respectively, on their outer peripheral surfaces. The first and second nut members 17 and 18 further include first and second female threaded holes 17b and 18b, respectively. The first and second female threaded holes 17b and 18b are disposed on inner peripheral surfaces of the first and second nut members 17 and 18, respectively. The first and second female threaded holes 17b and 18b mate with the male threaded section 21. The first nut member 17 contacts the fastening member 16. Specifically, the first nut member 17 contacts the second ring part 33 of the ring member 26 of the fastening member 16. Accordingly, it is possible to move the adjustment member 15 in the vertical direction by making contact with the second ring part 33. The second nut member 18 is a lock nut for locking the rotation of the first nut member 17 through a double nut effect after adjusting the ball bearing contact.

As is shown in FIGS. 2, 3 and 7, an outer periphery of the attachment ring 19 has a first central axis O1. In other words, the outer periphery of the attachment ring 19 is disposed concentric with the head tube 102a. The attachment ring 19 is disk-shaped and includes a guard retainer part 19a, an attachment aperture 19b, a rotation-stop protrusion 19c, a retainer thin-wall 19d and a retainer thick-wall 19e. The guard retainer part 19a is formed on a top surface of the attachment ring 19. The attachment aperture 19b is eccentrically formed from the center of the outer periphery of the attachment ring 19. The fork column 98a passes through the attachment aperture 19b. The attachment ring 19 is constrained in its motion downward by the fork step 98c that is fabricated on the fork shoulder 98b. The fork shoulder 98b is the base edge part of the fork column 98a and does not rotate. The attachment aperture 19b extends through to the fork shoulder 98b as well. The guard retainer part 19a is formed with a tapered surface narrowing towards the tip which is facing upwards. The guard retainer part 19a contacts the bottom taper surface 12d of the bottom ball bearing unit 11b. The attachment aperture 19b has the same diameter as the through-bore 20a of the tubular element 20 of the adjustment member 15. Furthermore, the attachment aperture 19b is concentric with the through-bore 20a. In other words, both the attachment aperture 19b and the through-bore 20a are formed about the second central axis O2.

Still referring to FIGS. 2, 3 and 7, the rotation stop protrusion 19c is fabricated on a bottom surface of the attachment ring 19 at a thinnest section of the retainer thin-wall 19d. The rotation-stop protrusion 19c mates with the indentation 98d fabricated on the fork step 98c. As a result, when the attachment ring 19 is attached to the front fork 98, the retainer thin-wall 19d is disposed behind the retainer thick-wall portion 19e. That is, the retainer thin-wall 19d is on the side of the front fork 98 closest to the rearward section of the front wheel 106f.

In the present embodiment, the adjustment member 15 and the fork column 98a move relative to each other. The first nut member 17 applies pressure to the top ball bearing unit 11a. Pressure is also propagated by the fork shoulder 98b to the bottom ball bearing unit 11b. This makes it possible to adjust the ball bearing contact of both the top and bottom ball bearing units 11a and 11b.

The assembly sequence for attaching the front fork 98 to the head tube 102a using the bicycle headset 10 will now be described.

Prior to assembly, as preparation work, the second nut member 18 is threaded on the adjustment member 15 followed by the first nut member 17. The top and bottom ball bearing units 11a and 11b are attached to the top and bottom ends of the head tube 102a, respectively. The cover member 50 is disposed on the ring-shaped attachment groove 22a. In addition, the electrical wiring 60 is passed through the inside of the head tube 102a.

Once this preparation work has been completed, the attachment ring 19 is slid over the top of the fork column 98a and placed on top of the fork shoulder 98b. The rotation stop protrusion 19c is mated into the indentation 98d to prevent rotation. Next, the fork column 98a of the front fork 98 is installed by inserting it into the head tube 102a from the bottom side to cause the attachment ring 19 to contact the bottom ball bearing unit 11b.

Referring to FIG. 4, the fastening member 16 is then placed on top of the first nut member 17. The adjustment member step 20e of the adjustment member 15 is mated with the fastening member step 33c of the fastening member 16. In this state, the adjustment member 15, the first and second nut members 17 and 18 and the fastening member 16 are slid over the top part of the fork column 98a that has emerged from the head tube 102a, as is illustrated in FIG. 3. Specifically, the adjustment member 15 is lowered to a position wherein the retainer part 22 contacts the top ball bearing unit 11a. The protruding part 31 is then disposed so as to face backwards, thereby causing the thin-wall 33a of the second ring part 33 to be disposed at the rear. Furthermore, the electrical wiring 60 is passed through the wire access aperture 62 and rests in the wire insertion groove 61. An Allen wrench or the like is used to tighten the tightening bolt 27, which decreases the width of the fastening member slit 32 and securely fastens the ring member 26 to the fork column 98a. The first nut member 17 is then rotated in the opposite direction in which it was tightened onto the adjustment member 15, i.e. counterclockwise when viewed from above. The first nut member 17 is rotated using a tool, such as a crescent wrench or spanner. Preferably, the tool grasps the tool mating part 17a. As the first nut member 17 is turned counterclockwise, the first nut member 17 moves upward to contact the second ring part 33 of the ring member 26 of the fastening member 16. The ring member 26, which is rigidly attached to the fork column 98a above the first nut member 17, sets a vertical limit for the first nut member 17. In other words, at its highest position on the fork column 98a, the first nut member 17 contacts the second ring part 33 of the ring member 26.

As a result of the above construction, when the first nut member 17 is rotated, the adjustment member 15 and the fork column 98a move relative to each other. Accordingly, the retainer part 22 of the adjustment member 15 contacts the top taper surface 12c of the top inner ring 12a of the top ball bearing unit 11a so that pressure is applied to the top inner ring 12a. In addition, the guard retainer part 19a of the attachment ring 19 applies pressure to the bottom taper surface 12d of the bottom inner ring 12b of the bottom ball bearing unit 11b. Furthermore, as the first nut member 17 is rotated, the applied force increases gradually, thereby gradually increasing the force on the ball bearings. When the ball bearing contact has been adjusted to allow the front fork 98 to turn smoothly without rattling, the second nut member 18 is tightened against the first nut member 17 to lock the first nut member 17. Accordingly, the front fork 98 is installed using the bicycle headset 10 to adjust the ball bearing contact with the head tube 102a.

When the above assembly is complete, the handle stem 111 is installed at the top edge of the fork column 98a at the desired vertical position. The adjustment member 15 and the fastening member 16 are disposed on the outer peripheral part of the fork column 98a so that the ball bearing contact can be adjusted without installing the handle stem 111. Because of this, it is possible to adjust the ball bearing contact independent of the handle stem 111. Consequently, it is easier to adjust the vertical position of the handle member 104.

As used herein to describe the present invention, the following directional terms "forward, rearward, top, bottom, rear, front, above, downward, vertical, horizontal, below and transverse" as well as any other similar directional terms refer to those directions of a bicycle equipped with the present invention and based on the perspective of the rider of the bicycle. Accordingly, these terms, as utilized to describe the present invention should be interpreted relative to a bicycle equipped with the present invention and from a viewpoint behind the bicycle.

Second Embodiment

Figure 8:
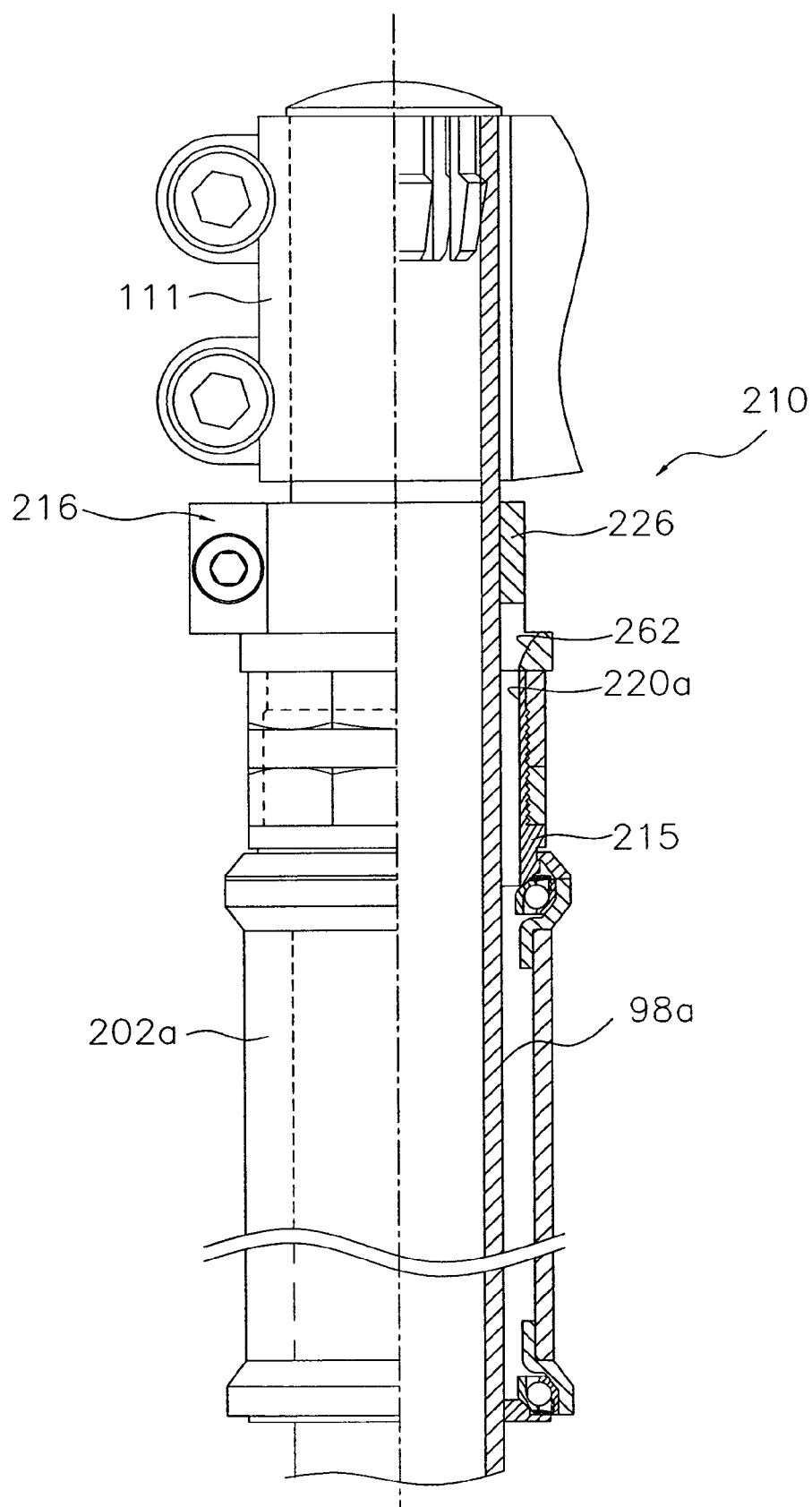
FIG. 8 is a partial cross-sectional view of a bicycle headset coupled to the front fork and head tube of the bicycle illustrated in FIG. 1 in accordance with a second embodiment of the present invention.

Referring now to FIG. 8, a bicycle headset 210 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the first embodiment, the second central axis O2 of the fork column 98a was eccentric relative to the first central axis O1 of the head tube 102a in order to facilitate the passage of the electrical wiring 60. However, it need not necessarily be eccentric. The bicycle headset 210 is essentially the same as in the first embodiment except that the entire ring member 226 of the fastening member 216 and the adjustment member 215 are disposed concentrically relative to the fork column 98*a* and the head tube 202*a*. In particular, if the inner diameter of the head tube 202*a* is more oversized than the first embodiment, e.g. about 35 mm, the through-bore 220*a* of the adjustment member 215 can perform the function of the wire insertion groove 61 of the first embodiment without being eccentric. The wire access aperture 262 is continuous with the through-bore 220*a*. Moreover, when it is not necessary to pass electrical wiring, there is no need for eccentricity, even when using a normal sized head tube, i.e. where the inner diameter of the head tube 102*a* is about 30 mm.

Third Embodiment

Figure 9:
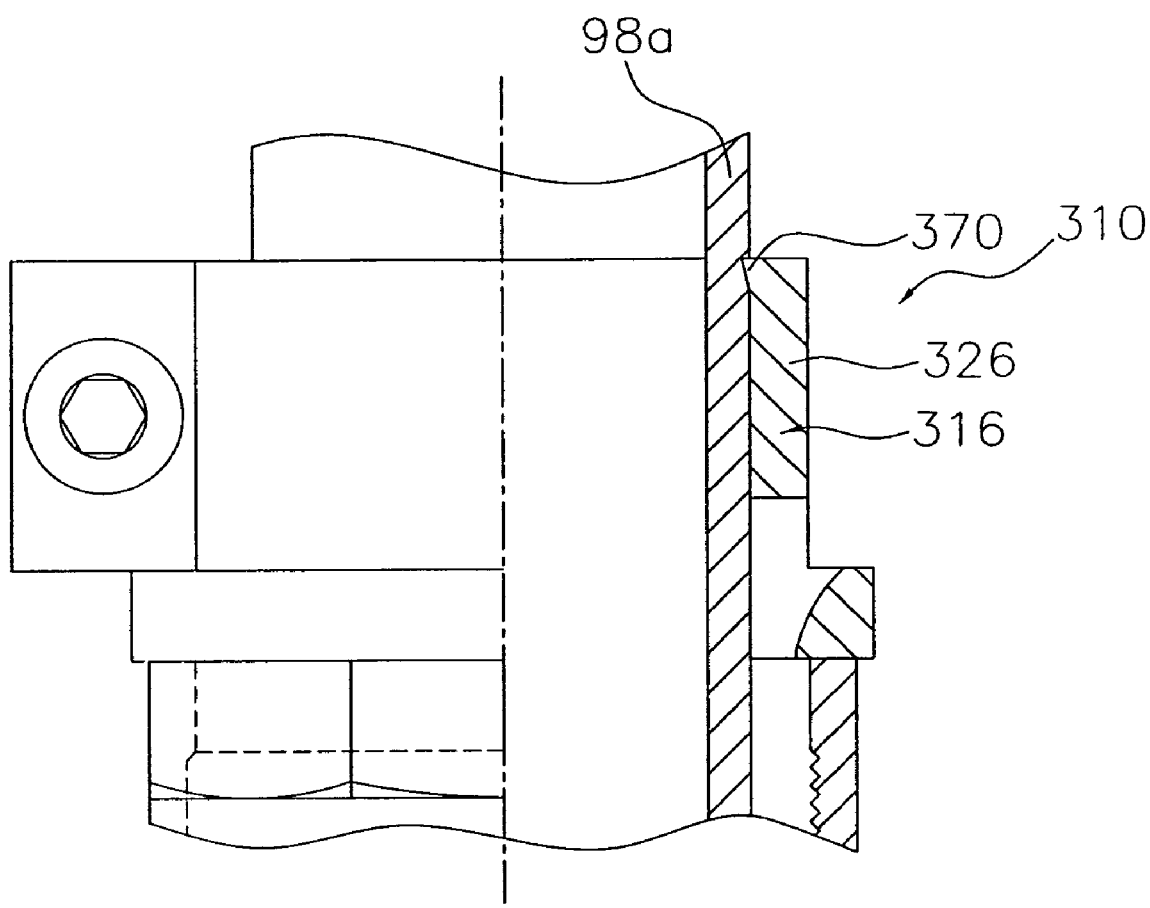
FIG. 9 is a partial cross-sectional view of a section of a bicycle headset coupled to the front fork of the bicycle illustrated in FIG. 1 in accordance with a third embodiment of the present invention.

Referring now to FIG. 9, a bicycle headset 310 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The bicycle headset 310 is essentially the same as in the first embodiment except that the ring member 326 can be formed with a protrusion on an inner peripheral surface of the ring member 326 of the fastening member 316. Preferably, the protrusion is a ring-shaped protruding part 370 with a narrow peak, as shown in FIG. 9. The ring-shaped protruding part 370 is structured so as to bite into the outer peripheral surface of the fork column 98*a*. In this case, the fastening member 316 will be fastened even more securely to the fork column 98*a*.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle headset comprising:

a tubular adjustment member having a top end portion, a bottom end portion, a through-bore configured and arranged for receiving a bicycle fork column, a male threaded section on an outer peripheral surface of the top end portion and a retainer part disposed on the bottom end portion that is configured and arranged to retain at least one bearing;

a fastening member configured and arranged to be releasably attached to the bicycle fork column by applying pressure to an outer peripheral side of the bicycle fork column, the fastening member being adjacent the top end portion of the adjustment member and having a mating part that mates to the adjustment member such that the fastening member is freely movable in an axial direction; and a first nut member having a first female threaded hole that mates with the male threaded section such that the first nut member contacts the fastening member, the first nut member and the tubular adjustment member being arranged and configured such that a first rotational movement of the first nut member causes the first nut member to move axially away from the retainer part and increases axial separation of the retainer part relative to the fastening member.

2. The bicycle headset according to claim 1 wherein the fastening member includes a first ring part configured and arranged to be disposed on the outer peripheral surface of the bicycle fork column, a protruding part that protrudes in an outer radial direction of the first ring part, a slit in the protruding part, and a locking member disposed on the protruding part to adjust the width of the slit.

3. The bicycle headset according to claim 1, wherein the retainer part of the adjustment member is configured and arranged to press the bearing in the axial direction and a radial direction.

4. A bicycle headset comprising:

a tubular adjustment member having a top end portion, a bottom end portion, a through-bore configured and arranged for receiving a bicycle fork column, a male threaded section on an outer peripheral surface of the top end portion and a retainer part disposed on the bottom end portion that is configured and arranged to retain at least one bearing;

a fastening member configured and arranged to be releasably attached to the bicycle fork column by applying pressure to an outer peripheral side of the bicycle fork column, the fastening member being adjacent the top end portion of the adjustment member and having a mating part that mates to the adjustment member such that the fastening member is freely movable in an axial direction;

a first nut member having a first female threaded hole that mates with the male threaded section such that the first nut member contacts the fastening member; and a second nut member having a second female threaded hole that mates with the male threaded section such that the second nut member contacts the first nut member.

5. The bicycle headset according to claim 4, wherein the fastening member includes a first ring part configured and arranged to be disposed on the outer peripheral surface of the bicycle fork column, a protruding part that protrudes in an outer radial direction of the first ring part, a slit in the protruding part and a locking member disposed on the protruding part to adjust the width of the slit.

6. The bicycle headset according to claim 4, wherein the through-bore of the adjustment member is eccentric relative to an outer peripheral surface of the adjustment member.

7. The bicycle headset according to claim 6, wherein the fastening member includes a first ring part disposed concentric with the through-bore of the adjustment member and a second ring part integral with the first ring part and disposed facing the adjustment member, the second ring part having the mating part disposed concentric with the adjustment member.

8. The bicycle headset according to claim 4, wherein the retainer part of the adjustment member is configured and arranged to press the bearing in the axial direction and a radial direction.

9. A bicycle headset comprising:
a tubular adjustment member having a top end portion, a bottom end portion, a through-bore configured and arranged for receiving a bicycle fork column, a male threaded section on an outer peripheral surface of the top end portion and a retainer part disposed on the bottom end portion that is configured and arranged to retain at least one bearing;
a fastening member configured and arranged to be releasably attached to the bicycle fork column by applying pressure to an outer peripheral side of the bicycle fork column, the fastening member being adjacent the top end portion of the adjustment member and having a mating part that mates to the adjustment member such that the fastening member is freely movable in an axial direction; and
a first nut member having a first female threaded hole that mates with the male threaded section such that the first nut member contacts the fastening member,
the through-bore of the adjustment member being eccentric relative to an outer peripheral surface of the adjustment member.

10. The bicycle headset according to claim 9, wherein the fastening member includes a first ring part configured and arranged to be disposed on the outer peripheral surface of the bicycle fork column, a protruding part that protrudes in an outer radial direction of the first ring part, a slit in the protruding part, and a locking member disposed on the protruding part to adjust the width of the slit.

11. The bicycle headset according to claim 10, wherein the first ring part is concentric with the through-bore of the adjustment member and the fastening member includes a second ring part integral with the first ring part and disposed facing the adjustment member, the second ring part having the mating part disposed concentric with the adjustment member.

12. The bicycle headset according to claim 9, wherein the fastening member includes a first ring part disposed concentric with the through-bore of the adjustment member and a second ring part integral with the first ring part and disposed facing the adjustment member, the second ring part having the mating part disposed concentric with the adjustment member.

13. The bicycle headset according to claim 9, wherein the adjustment member has a wall of varying thickness and a wire insertion groove extending in the axial direction at a maximum thickness of the wall.

14. The bicycle headset according to claim 13, wherein the fastening member further includes an interface section between the first ring part and the second ring part and a wire access aperture continuous with the wire insertion groove disposed in the second ring part and the interface section to access wiring from outside.

15. The bicycle headset according to claim 13, wherein the fastening member includes a first ring part disposed concentric with the through-bore of the adjustment member and a second ring part integral with the first ring part and disposed facing the adjustment member, the second ring part having the mating part disposed concentric with the adjustment member.

16. A The bicycle headset comprising:
a tubular adjustment member having a top end portion, a bottom end portion, a through-bore configured and arranged for receiving a bicycle fork column, a male threaded section on an outer peripheral surface of the top end portion and a retainer part disposed on the bottom end portion that is configured and arranged to retain at least one bearing;
a fastening member configured and arranged to be releasably attached to the bicycle fork column by applying pressure to an outer peripheral side of the bicycle fork column, the fastening member being adjacent the top end portion of the adjustment member and having a mating part that mates to the adjustment member such that the fastening member is freely movable in an axial direction; and
a first nut member having a first female threaded hole that mates with the male threaded section such that the first nut member contacts the fastening member,
the mating part of the fastening member being a fastening member step that protrudes from a surface of the fastening member that faces the adjustment member and extends toward the adjustment member.

17. The bicycle headset according to claim 16, wherein the adjustment member has an adjustment member step that non-rotatably mates with the fastening member step to allow axial movement.

18. A bicycle headset comprising:
a tubular adjustment member having a top end portion, a bottom end portion, a through-bore configured and arranged for receiving a bicycle fork column, a male threaded section on an outer peripheral surface of the top end portion and a retainer part disposed on the bottom end portion that is configured and arranged to retain at least one bearing;
a fastening member configured and arranged to be releasably attached to the bicycle fork column by applying pressure to an outer peripheral side of the bicycle fork column, the fastening member being adjacent the top end portion of the adjustment member and having a mating part that mates to the adjustment member such that the fastening member is freely movable in an axial direction; and
a first nut member having a first female threaded hole that mates with the male threaded section such that the first nut member contacts the fastening member,
the adjustment member having a wall of varying thickness and a wire insertion groove extending in the axial direction at a maximum thickness of the wall.

19. The bicycle headset according to claim 18, wherein the fastening member includes a first ring part disposed concentric with the through-bore of the adjustment member and a second ring part integral with the first ring part and disposed facing the adjustment member, the second ring part having the mating part disposed concentric with the adjustment member.

20. The bicycle headset according to claim 19, wherein the fastening member further includes an interface section between the first ring and the second ring and a wire access aperture continuous with the wire insertion groove in the interface section to access wiring from outside.

* * * * *